UNITED STATES PATENT OFFICE.

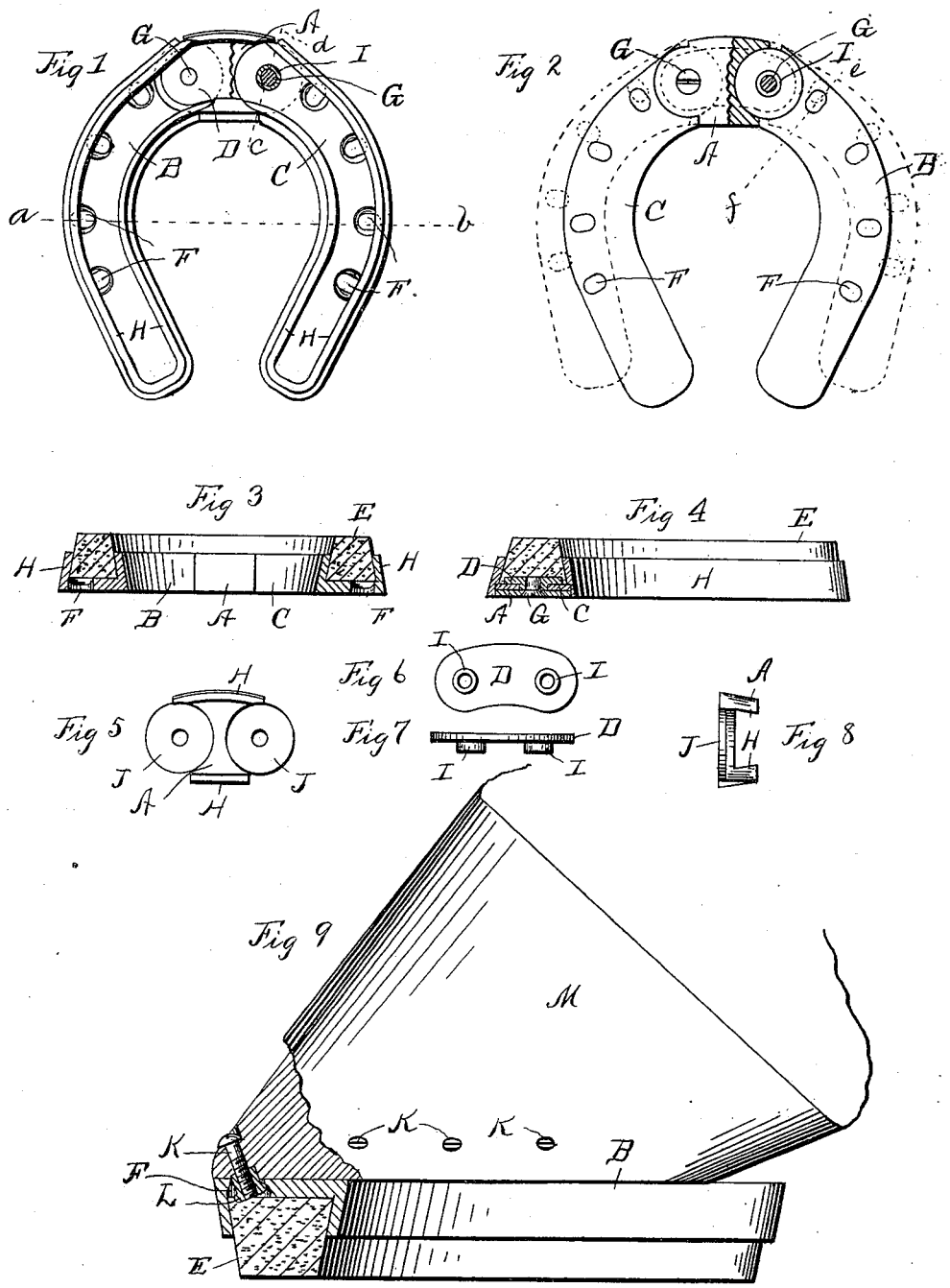

ROBERT W. PADDEN, OF KANSAS CITY, MISSOURI.

HORSESHOE.

SPECIFICATION forming part of Letters Patent No. 681,370, dated August 27, 1901.

Application filed December 22, 1899. Serial No. 741,286. (No model.)

*To all whom it may concern:*

Be it known that I, ROBERT W. PADDEN, a citizen of the United States of America, residing at Kansas City, in the county of Jackson and State of Missouri, have invented a certain new and useful Improvement in Horseshoes, of which the following is a specification, reference being had therein to the accompanying drawings.

My invention relates to improvements in horseshoes.

One object of my invention is to provide a horseshoe that will readily adapt itself to the form of the hoof.

My invention has, further, for its object the providing of a shoe that will expand laterally with the hoof to which it is secured when the weight of the horse is upon the shoe.

My invention provides, further, a horseshoe comprising a plurality of parts so hinged together that the parts may be swung laterally with respect to each other, thus enabling the shoe to be fitted to different shapes of hoofs and also to permit the parts to give laterally under pressure, thus preventing the cramping experienced in the ordinary shoe, wherein the hoof is held rigidly and is unable to expand naturally when the weight of the horse is placed upon it.

My invention provides, further, a novel form of resilient pad for the shoe and manner of securing the same to the shoe.

My invention provides, still further, a novel securing mechanism by which the devices used to fasten the shoe to the hoof may be swung radially with respect to the center of the shoe, and thus conform to the particular angle of the periphery of the hoof to which the shoe is secured.

My invention comprises, still further, certain novel and useful features of construction hereinafter fully described and claimed.

In the accompanying drawings, which illustrate my invention, Figure 1 represents a bottom view of a shoe constructed in accordance with the principles of my invention. In this figure a portion of the clamping-plate D is broken away in order to more fully disclose the shapes of the parts thereunder. The resilient pad E is removed. Fig. 2 represents a top view of the shoe or the reverse from the view shown in Fig. 1. In this figure a portion of the central or toe member is broken away in order to show the shape of the forward end of the side member B. The shoe expanded or having the side members swung laterally is shown in this figure in dotted lines. Fig. 3 represents a transverse sectional view taken on the dotted line *a b* of Fig. 1, the resilient pad being shown in place and the securing-screws removed. Fig. 4 represents a transverse sectional view taken on the dotted line *c d* of Fig. 1. Fig. 5 represents a bottom view of the central or toe member detached. Fig. 6 represents a top view of the clamping-plate D detached. Fig. 7 represents a front edge view of the same. Fig. 8 represents an end view of the toe member A. Fig. 9 represents a side elevation view of a hoof with a portion of the hoof in section and the shoe shown in vertical cross-section on the dotted line *e f* of Fig. 2.

Similar letters of reference indicate similar parts throughout the several views.

The shoe comprises three principal parts— the central or toe member A and the two side members B and C, respectively. The toe member is approximately elliptical in form and is provided on its front and rear sides with inwardly and downwardly extending walls H, which coöperate with similar walls H on the inner and outer sides of the side members to form a channel in the under side of the shoe, which is dovetailed in cross-section. The ends, as indicated by J of the toe member, are arc-shaped and are circularly milled, so as to form a halved or knuckle joint with the forward ends of the two side members, each of which is arcuate at its end, so as to fit the milled portion of the center member, and which is also milled, so as to conform to the outer curved end of the said center piece. The two side members are pivotally connected to the member A by means of the screws G, which extend through holes provided in the member A and have their inner ends respectively engage the screw-threaded openings provided in the upwardly-extending cylindrical projections I, disposed on the upper side of the clamping-plate D and entering holes provided in the forward ends of the side arm or members B and C, respectively, and which form fulcrums on which the said side members may be laterally swung.

The side members B and C are provided with a series of holes F in their upper sides, in which are located fastening devices comprising, preferably, screws K, which extend through holes provided in the outer edge of the hoof M and through the holes F. The lower ends of the screws K are provided each with a nut L, the lower end of which is enlarged and rounded and fits a rounded countersunk recess encircling the hole F. This construction of the nut L and the shape of the hole F, which is preferably elliptical in form, permits the radial movement of the upper end of the screw K with respect to the center of the shoe, so that the heads of the screws conform more nearly to different angles of the outer peripheries of different hoofs. Where the angle of the outer side of the hoof is very steep—as, for instance, in that shown in the drawings—the hoof may be countersunk to permit the flat seating of the head of the screw. Other devices may be used for securing the shoe to the hoof, the arrangement and shape of the holes F being such that radial adjustment may be given to other devices than screws.

The pad E is composed of some resilient substance, preferably soft rubber, the shape of which conforms to the inner shape of the channel in the under side of the body of the shoe into which it is forced. The pad projects below the under side of the body of the shoe and is held in place by its dovetail fit in the channel.

The shoe may be used without the pad E, in which case it is desirable to dispense with the side walls H and use the ordinary calks instead.

The screws G may be removed and suitably-shaped side members may be used to replace those which are attached to the toe-piece A if they are not of the shape desired for fitting the hoof to which they are to be applied.

In securing the shoe to the hoof the holes for the screws K are first punched or drilled in the hoof in the proper places, after which the shoe is applied with the flat upper side of the same against the under side of the hoof. The screws K are then inserted and are secured by affixing the nuts L thereon. The pad E is then inserted in the channel in the under side of the shoe. After the shoe has been applied when pressure is applied to the hoof it can expand in the natural manner at the rear side instead of being held tightly bound, as it is when secured to the ordinary shoe.

One form of shoe may be made to fit many hoofs, while it is obvious that various forms of side members may be made, so that no forging will be required to fit a shoe, it being but necessary to select approximately proper-shaped side members and affix them to the center member. My invention may be variously modified without departing from its spirit.

Having thus described my invention, what I claim, and desire to secure by Letters Patent, is—

1. A horseshoe comprising a central toe member, a clamping member disposed opposite and rigidly secured thereto and provided with two projections extending toward the toe member, and two side members pivoted one to each of said projections on the clamping member, substantially as described.

2. A horseshoe comprising a central toe member, a clamping member disposed opposite and rigidly secured thereto and provided with two projections extending toward the toe member, the said projections being each provided with a screw-threaded opening, a screw in each of said openings and extending through the toe member, and two side members pivoted one to each of said projections, substantially as described.

3. A horseshoe comprising a central toe member, a clamping member disposed opposite and rigidly secured thereto, two side members secured pivotally one at each end of and between the toe and clamping members, and a resilient pad secured upon the bottom sides of the toe and side members, substantially as described.

4. A horseshoe comprising a central toe member, a clamping member disposed opposite and rigidly secured thereto, two side members secured pivotally one at each end of and between the toe and clamping members, the toe and side members being provided on their inner and outer sides with downwardly-extending parallel walls forming a channel on the under sides thereof, and a resilient pad located in the said channel, substantially as described.

5. A horseshoe comprising a central toe member, a clamping member disposed opposite and rigidly secured thereto, two side members secured pivotally one at each end of and between the toe and clamping members, the toe and side members being provided on their inner and outer sides with downwardly-extending converging side walls forming a dovetail channel on the under side thereof, and a resilient pad located in the said channel, substantially as described.

In testimony whereof I have signed my name to this specification in presence of two subscribing witnesses.

ROBERT W. PADDEN.

Witnesses:
 WARREN D. HOUSE,
 LAURENCE E. LYONS.